United States Patent
Goyal et al.

(10) Patent No.: US 11,595,255 B2
(45) Date of Patent: Feb. 28, 2023

(54) VISUAL TRACKING OF LOGICAL NETWORK STATE

(71) Applicant: VMware, Inc., Palo Alto, CA (US)

(72) Inventors: Kapil Goyal, San Jose, CA (US); W. Andrew Lambeth, San Francisco, CA (US); Tea Liukkonen-Olmiala, Santa Clara, CA (US); Kausum Kumar, Los Gatos, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/133,561

(22) Filed: Dec. 23, 2020

(65) Prior Publication Data

US 2021/0226845 A1 Jul. 22, 2021

Related U.S. Application Data

(60) Provisional application No. 62/961,871, filed on Jan. 16, 2020.

(51) Int. Cl.
*H04L 41/0816* (2022.01)
*H04L 41/22* (2022.01)
*H04L 41/12* (2022.01)

(52) U.S. Cl.
CPC ......... *H04L 41/0816* (2013.01); *H04L 41/12* (2013.01); *H04L 41/22* (2013.01)

(58) Field of Classification Search
CPC ...... H04L 41/0816; H04L 41/22; H04L 41/12
See application file for complete search history.

(56) References Cited

U.S. PATENT DOCUMENTS

| | | | |
|---|---|---|---|
| 8,024,772 B1* | 9/2011 | Yehuda | H04L 41/069 726/1 |
| 9,235,409 B1* | 1/2016 | Guo | G06F 8/65 |
| 10,587,479 B2* | 3/2020 | Shakimov | H04L 41/0873 |
| 2005/0080801 A1* | 4/2005 | Kothandaraman | H04L 67/02 |
| 2005/0234931 A1* | 10/2005 | Yip | H04L 41/0816 |
| 2009/0150887 A1* | 6/2009 | Sanghvi | G06F 3/0482 718/102 |

(Continued)

FOREIGN PATENT DOCUMENTS

KR 101728579 B1 * 4/2017 ......... H04L 41/0816

OTHER PUBLICATIONS

Pisa, Pedro Silveira et al. "VNEXT: Virtual network management for Xen-based Testbeds." 2011 International Conference on the Network of the Future: 41-45. (Year: 2011).*

(Continued)

*Primary Examiner* — John M MacIlwinen
(74) *Attorney, Agent, or Firm* — Adeli LLP

(57) ABSTRACT

Some embodiments provide a method for visualizing a realization status of configuration changes for a set of logical entities of a logical network. The method generates a first presentation of a list of logical entities and a realization status for each logical entity in the list, where the realization status indicates whether all configuration changes for the logical entity have been realized. In response to a selection of a particular logical entity in the displayed list for which at least one configuration change has not been realized, the method generates a second presentation comprising a view of pending configuration changes for the selected particular logical entity.

22 Claims, 9 Drawing Sheets

(56) References Cited

U.S. PATENT DOCUMENTS

| | | | | |
|---|---|---|---|---|
| 2011/0225217 A1* | 9/2011 | Plax | ............ | G06F 16/2282 |
| | | | | 707/825 |
| 2012/0023546 A1* | 1/2012 | Kartha | ............ | H04L 63/104 |
| | | | | 726/1 |
| 2017/0264483 A1* | 9/2017 | Lambeth | ............ | H04L 41/0806 |
| 2018/0063194 A1* | 3/2018 | Vaidya | ............ | H04L 63/0263 |
| 2020/0021511 A1* | 1/2020 | Xu | ............ | G06F 16/1824 |

OTHER PUBLICATIONS

Hirasawa et al. "A study on controlling multiple physical nodes as a single logical node". NTT Network Service Systems Laboratories, IEICE. (Year: 2018).*

* cited by examiner

VISUAL TRACKING OF LOGICAL NETWORK STATE

BACKGROUND

In a physical network, network functions and services are defined by network standard protocols and implemented by physical network devices. When a network issue occurs, a user (e.g., a network administrator) can diagnose the physical network using diagnosis tools provided by the device vendors. However, in a distributed virtual network (e.g., a logical network), network functions and services are implemented by logical entities (e.g., a set of logical forwarding elements such as logical switches and logical routers) that span multiple different physical nodes. A definition for each logical entity is received from the user, and based on that definition, data that defines the logical entity is stored at the management plane of the logical network. This defining data, referred to as the desired state, is then processed and distributed by the control plane of the logical network to hypervisors executing on the physical nodes to realize the logical entities (e.g., to configure and implement the logical entities). Currently, there is no way for a user to visualize in real time whether the desired state for a specific logical entity, or for a specific configuration change, has been realized in the physical network infrastructure.

BRIEF SUMMARY

Some embodiments of the invention provide a method for real-time visualization of the realization status of configuration changes for logical entities in a logical network implemented by transport nodes of a physical network. Configuration changes may arise from user input or from changes in the network topology. The logical entities (e.g., logical routers, logical switches, logical router ports, logical switch ports, etc.) are presented on the interface in some embodiments with an overall realization status. The overall realization status represents whether all the desired configuration changes have been successful (i.e., whether the "desired state" of the logical network has been realized), whether any changes are still in progress, or whether there were any errors or problems in realizing or determining the desired state. Some embodiments identify each transport node that implements the logical entity, and display the realization status for the desired state at each transport node.

Some embodiments also present information about specific configuration changes for a logical entity on the interface. For example, pending configuration changes that have been submitted for a logical entity are displayed in some embodiments as a timeline. In some embodiments, only those pending configuration changes that have been submitted within a configurable period of time (i.e., an "attention window") are displayed on the timeline. Pending changes that are older than the attention window are indicated by changing the overall realization status of the logical entity to "in progress" rather than "success." Some embodiments omit successfully implemented configuration changes from the timeline, including those that have been submitted within the attention window.

As discussed above, the realization status may be presented on the interface as an overall realization status for a logical entity, or a node realization status for an individual transport node that implements the logical entity. In both cases, the realization status is presented in some embodiments as an error status when at least one configuration change has resulted in an error. In some embodiments, the realization status is presented as an unknown status if the individual transport node (in the case of a node realization status) or at least one transport node (in the case of the overall realization status) is not reachable to query the realization status. If there are no errors and all transport nodes are reachable, and at least one configuration change is still pending, then in some embodiments the realization status is presented as an in-progress status. If there are no errors, all transport nodes are reachable, and no configuration changes are still pending (e.g., the desired state has been fully realized), then in some embodiments the realization status is presented as a success status. The different types of realization status may be represented as different symbols, colors, or with other different types of indicators on the interface.

Information regarding an individual pending configuration update is also presented on the interface in some embodiments. In some embodiments, this information includes whether the individual configuration update is due to a user's input or due to a topology change, details about the user or topology change, what properties of the logical entity were modified by the configuration change, and old and new values of the modified properties.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for real-time visualization of the realization status of configuration changes for logical entities (e.g., logical routers, logical switches, logical router ports, logical switch ports, etc.) in a logical network implemented by transport nodes of a physical network. Specifically, in some embodiments a user can monitor whether the desired logical network state is configured successfully at the intended transport nodes, and whether the packet processing software at the transport nodes are successfully using this desired state.

Configuration changes may arise in some embodiments from user input and from changes in the network topology. The management plane pushes the desired state received from the user to the control plane of the logical network to realize the logical entities, by generating configuration data that configures and implements the logical entities on physical network infrastructure. The desired state is further processed in some embodiments by various components of the network in a pipeline fashion, where each component transforms the state and passes it on to the next component until it reaches the intended transport nodes. In some embodiments, some components in the pipeline monitor and collect datacenter topology information and merge it with the desired state received from upstream components to create desired state input for the next component. As a result, changes in topology such as powering on/off of virtual machines (VMs), containers, and hypervisors, or movement of VMs and containers, can in some embodiments lead such components to reconfigure the transport nodes. Once the desired state for a logical entity has been successfully realized on the relevant transport nodes, the packet processing software on the transport nodes uses this state to make packet forwarding decisions for traffic.

Figure 1:
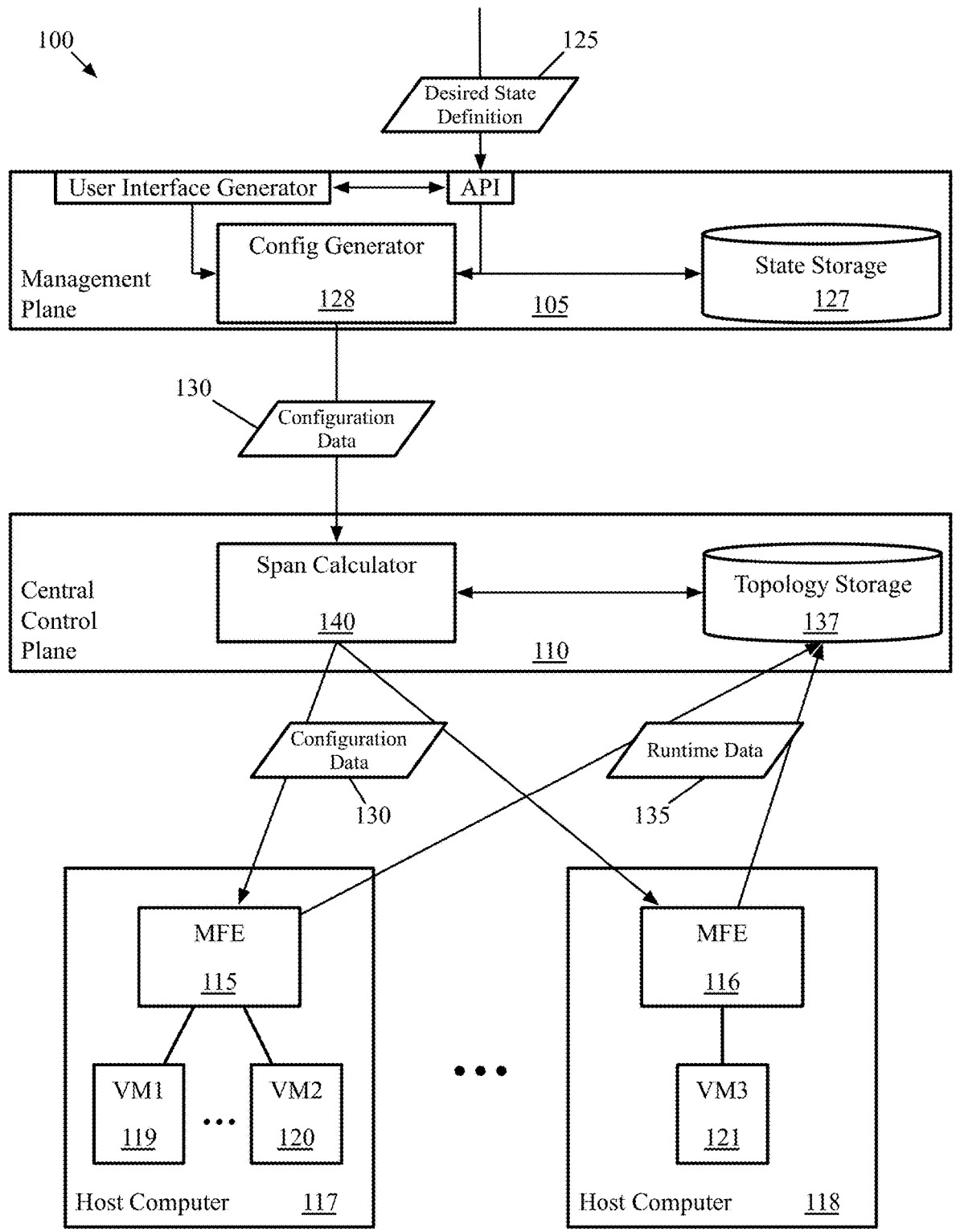
FIG. 1 conceptually illustrates an example of a physical network of some embodiments that implements a logical network.

FIG. 1 conceptually illustrates an example of a physical network 100 of some embodiments that implements a logical network. The physical network includes a management plane 105, a central control plane 110, and a set of transport nodes 115-116 executing on host computers 117-118. In some embodiments, the transport nodes are software managed forwarding elements (MFEs) instantiated and executing within virtualization software (e.g., hypervisors) running on the host computers 117-118. In some embodiments, the transport nodes also include hardware MFEs (not shown), such as Top-of-Rack (TOR) switches. Generally, the physical network 100 receives desired state configuration information defining the logical network from a user (e.g., a network administrator), and uses it to configure the MFEs 115-116 to implement logical entities of the logical network, as will be described in more detail below.

The management plane 105 is formed by one or more central network managers in some embodiments. These network managers may be separate physical computers or applications operating on controller/manager computers. As with the management plane 105, the central control plane 110 is formed by one or more central controllers in some embodiments. These central controllers may also be separate physical computers or applications operating on controller/manager computers. In some embodiments, the central controllers that form the central control plane 110 operate on the same computers as the network managers that form the management plane 105. Furthermore, in some embodiments one or more MFEs has an associated local controller operating within the same hypervisor as the MFE for converting configuration data received from the control plane 110 into data readable by the MFE (e.g., flow entries for a flow-based MFE), and/or a local management agent in the hypervisor for communicating directly with the management plane. The local controller and local agent are combined in some embodiments. In FIG. 1, central network controllers, local controllers, network managers, and local agents are omitted for clarity.

The MFEs 115-116 implement the logical entities in order to perform network traffic forwarding processing for the data messages (e.g., packets) that originate from and/or are directed to different data compute nodes (DCNs) 119-121 belonging to the logical network (e.g., VMs, containers, physical machines, etc.). In some embodiments, these DCNs also operate within the hypervisors on the host computers 117-118 alongside the software MFEs 115-16 to which they connect. In some embodiments, different subsets of DCNs reside on different host computers 117-118 that execute the MFEs 115-116. For example, in FIG. 1, virtual machines VM1 119 and VM2 120 execute on the same host computer 117 and are connected to MFE 115. The virtual machine VM3 121 executes on host computer 118 and is connected to MFE 116.

One of ordinary skill in the art would realize that the number of the host machines, central managers and controllers, and virtual machines described above and/or illustrated in the figures are exemplary, and that a logical network for a tenant of a hosting system may span a multitude of host machines (and third-party switches) and logically connect a large number of DCNs to each other (and to several other physical devices). Additionally, while shown as VMs in this figure and other figures below, it should be understood that other types of data compute nodes (e.g., namespaces, containers, etc.) may connect to the logical network in some embodiments.

A logical network, in some embodiments, includes a set of logical entities that are placed on different logical paths of the network. Examples of logical entities in a logical network include logical forwarding elements (LFEs) such as logical L2 switches and logical L3 routers, and logical ports of these logical switches and routers. The logical network entities, in some embodiments, also include other network elements including middleboxes, service engines, firewalls, load balancers, and tunnel endpoints.

Figure 2:
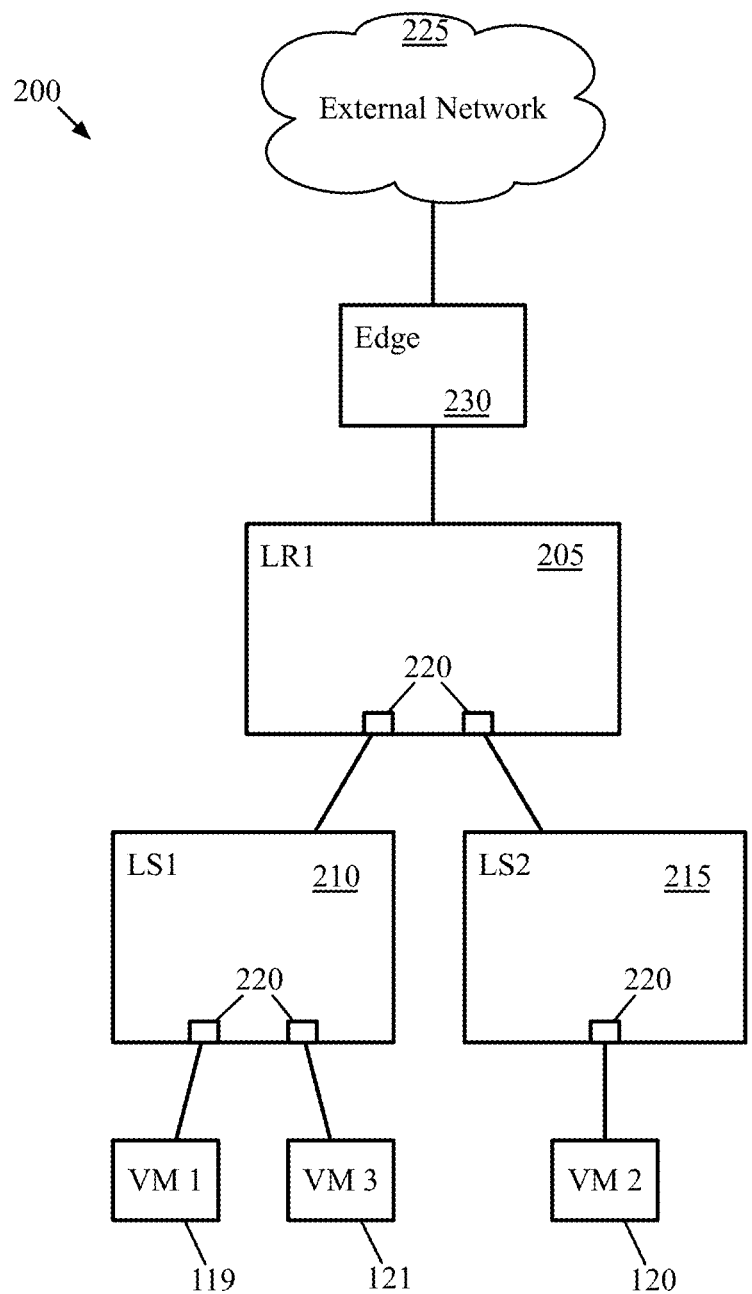
FIG. 2 conceptually illustrates an example of a logical network of some embodiments that is implemented by the physical network of FIG. 1.

FIG. 2 conceptually illustrates an example of a logical network 200 of some embodiments that is implemented by the MFEs 115-116 in the physical network 100 of FIG. 1. The logical network 200 has a number of LFEs, including logical router LR1 205 and two logical switches LS1 210 and LS2 215. These LFEs all have logical ports 220 through which they connect to each other, connect to external networks 225 (e.g., via an edge router 230), and connect to DCNs (e.g., VMs 119-121). The virtual machines VM1 119 and VM3 121 are both connected to the logical switch LS1 210, and the virtual machine VM2 120 is connected to logical switch 215. For example, VM1 and VM3 may be part of the same subnet of the logical network that is connected through LS1, and VM2 may be part of a different subnet connected through LS2.

Each MFE in the physical network 100 implements those LFEs of the logical network 200 to which the MFE's connected DCNs are logically connected. For example, MFE 115 implements the logical router LR1 205, and both logical switches LS1 210 and LS2 215, since it is connected to VM1 119 (which connects to LS1) and VM2 120 (which connects to LS2). However, MFE 116 only implements LR1 205 and LS1 210, and does not implement LS2 215, since it is connected to VM3 (which connects to LS1).

The management plane 105 receives desired state definition information 125 for the various logical network entities through an application programming interface (API) that enables administrators to set up and modify their logical networks. The management plane 105 stores definitions for each logical network entity in a state storage 127 (which is a distributed storage in some embodiments). When the desired state for an entity changes (e.g., because the administrator has modified the definition for the entity), the management plane 105 updates the desired state of that entity in the state storage 127.

After receiving a desired state definition for a logical network entity (e.g., creation of a new entity, changing an association of one entity with another, modifying an entity, etc.), a configuration generator module 128 in the management plane 105 generates corresponding configuration data 130 for the MFEs that implement the entity. The management plane 105 provides the generated configuration data 130 to the central control plane 110.

The central control plane 110 receives the entity configuration data 130, and determines which MFEs 115-116 require the configuration data for the particular entity. The central control plane 110 stores the network topology 137, and a span calculator module 140 identifies the MFEs that require configuration data for a particular logical entity based on the network topology 137. The central control plane 110 distributes the entity configuration data 130 to the identified MFEs 115-116. In some embodiments, the control plane 110 modifies the configuration data 130 for different MFEs, such as converting it to different data or protocol formats, or sending different portions of the configuration data (i.e., sharding) to different MFEs in the logical entity's span based on MFE location or other factors.

Typical configuration data 130, in some embodiments, includes but is not limited to data that defines the location of DCNs (e.g., the location of VMs on host machines), data that defines connection topology between the DCNs as well as the locations of LFEs in the topology, and data that defines middlebox services which are applied to the LFEs (e.g., distributed firewall policies).

The configuration data 130 received and stored in the control plane 110 and MFEs 115-116 is called the realized state of the logical network in some embodiments. The realized state of a logical entity, unlike the desired state of the logical entity, is an ephemeral system state in some embodiments. That is, the realized state of a logical entity is continuously changing as the system tries to converge to the desired state. The realized state may become unrealized at any point of time, as the environment of the system (e.g., a datacenter) changes (e.g., a virtual machine migrates, a hypervisor fails, etc.).

The realized state of logical entities can also be changed (updated) in some embodiments by runtime data 135 received at the control plane 110 of the logical network from the MFEs 115-116. For example, the control plane 110 uses the received runtime data 135 in some embodiments to update the topology stored in the topology storage 137, for use in subsequent calculations by the span calculator 140. Typical runtime data 135, in some embodiments, includes but is not limited to layer 2 control plane tables such as virtual tunnel endpoint (VTEP) tables, media access control (MAC) tables, address resolution protocol (ARP) tables, layer 3 routing tables such as routing information base (RIB) tables, forwarding information base (FIB) tables, and statistics data collected from the MFEs.

The realization of the desired state is visualized in some embodiments on a user interface that operates in some embodiments in the management plane 105 and/or the control plane 110. The logical entities are displayed on the interface in some embodiments with an overall realization status. The overall realization status represents whether all the desired configuration changes have been successful (i.e., whether the "desired state" of the logical network has been realized), whether any changes are still in progress, or whether there were any errors or problems in realizing or determining the desired state. Some embodiments identify each transport node that implements the logical entity, and display the realization status for the desired state at each transport node.

Figure 3:
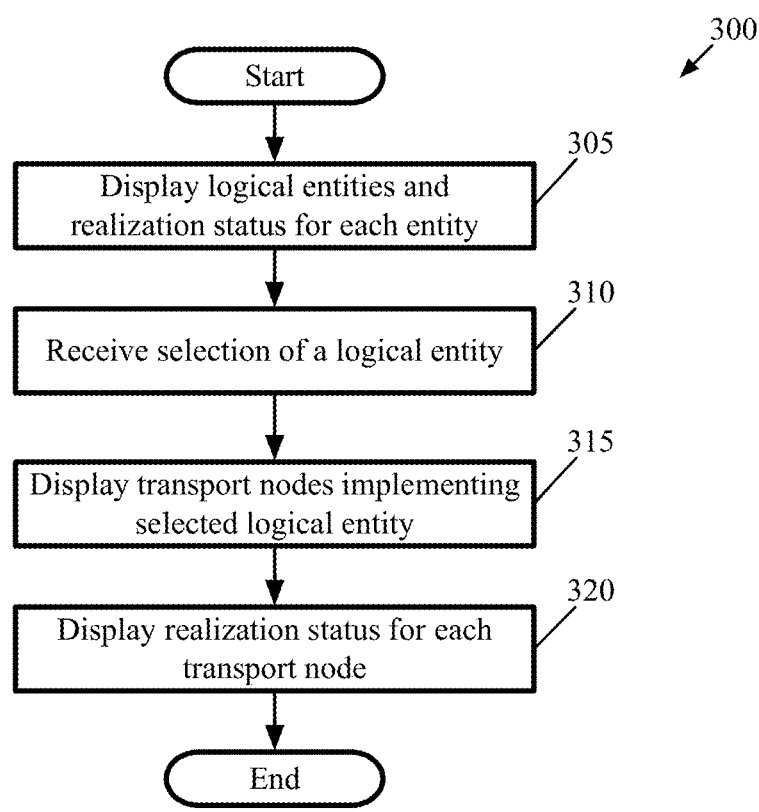
FIG. 3 illustrates a process of some embodiments to present the realization status of configuration changes for a logical entity on a user interface.

FIG. 3 illustrates a process 300 performed in some embodiments by the management plane 105 and/or the control plane 110 to present the realization status of configuration changes for a specific logical entity on a user interface. The specific operations of the process 300 may not be performed in the exact order shown and described. The specific operations may not be performed in one continuous series of operations, and different specific operations may be performed in different embodiments.

The process begins at 305 by displaying all the logical entities for a logical network, and the overall realization status of the desired state for each displayed logical entity. The realization status may be determined by different mechanisms operating within the control plane 110 and the management plane 105. Several examples are discussed briefly below, but one of ordinary skill in the art will understand that there may be other mechanisms not discussed here.

For example, in some embodiments, the realization status is determined by a diagnostic tool that compares the logical entities' desired state stored in the management plane 105 with a realized state stored in the control plane 110, and/or with the realized state stored in any of the transport nodes that implements the logical entities. Determining realization status using a diagnostic tool is described in more detail in U.S. Pat. No. 10,225,149, which is incorporated herein by reference.

As another example, in other embodiments, the realization status is determined based on a global realization number, that acts as a state sync barrier to track the realization of the desired state of the logical entities at the control plane 110. This global realization number (GRN) is incremented at different instances of time in some embodiments. The management plane 105, in addition to publishing the desired state to the control plane 110, publishes a new GRN value to the control plane 110 each time the GRN is incremented. The control plane 110 then associates the received GRN value with the realization state of the different logical entities that are published to the control plane 110 up to the time that the GRN value is received. Determining realization status using a global realization number is described in more detail in U.S. Pat. No. 10,243,797, which is incorporated herein by reference.

As a further example, in still other embodiments, the realization status is determined using state tracking objects stored at the management plane #0105 for certain logical network entities. The state tracking objects are propagated to the MFEs along with the logical network entity configuration. To determine whether a particular WIFE is implementing the most recent version of the logical network entity, some embodiments compare the state tracking object for the entity stored at the management plane #0105 with the state tracking object for the entity stored at the particular MFE (or at a local controller for the MFE). Determining realization status using a state tracking object is described in more detail in U.S. Pat. No. 10,938,658 which is incorporated herein by reference.

Through the user interface, the process 300 receives at 310 a user selection of one of the displayed logical entities. The process 300 displays at 315 a list of all transport nodes that implement the selected logical entity. In some embodiments, the list is generated by the span calculator 140 of the control plane 110.

For each transport node that implements the logical entity, the process 300 also displays at 320 a realization status for each transport node. As discussed above, the realization status is determined in different embodiments by a diagnostic tool, a global realization number, a state tracking object, or some other mechanism. The process 300 then ends.

Some embodiments also present information about specific configuration changes for a logical entity on the interface. For example, pending configuration changes that have been submitted for a logical entity are displayed in some embodiments as a timeline. In some embodiments, only those pending configuration changes that have been submitted within a configurable period of time (i.e., an "attention window") are displayed on the timeline. Pending changes that are older than the attention window are indicated by changing the overall realization status of the logical entity to "in progress" rather than "success." Some embodiments omit successfully implemented configuration changes from the timeline, including those that have been submitted within the attention window.

Figure 4:
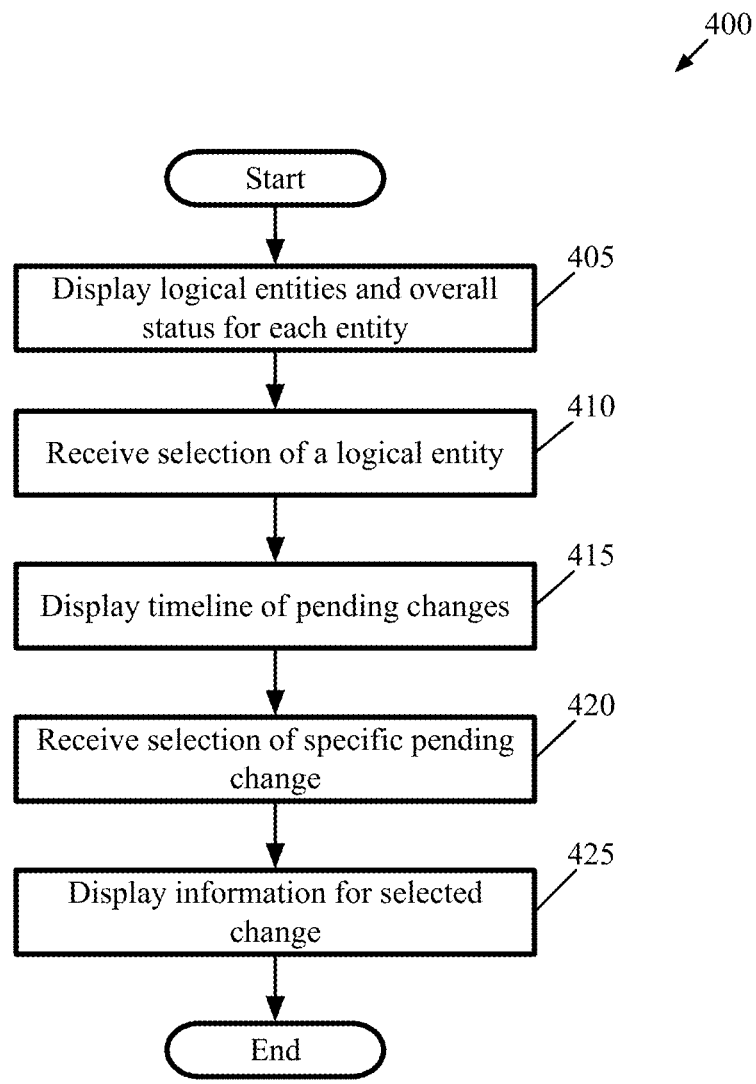
FIG. 4 conceptually illustrates a process of some embodiments to present the realization status of specific configuration changes for a logical entity on a user interface.

FIG. 4 conceptually illustrates a process 400 performed in some embodiments by the management plane 105 and/or the control plane 110 to present the realization status of specific configuration changes for a logical entity on a user interface. The specific operations of the process 400 may not be performed in the exact order shown and described. The specific operations may not be performed in one continuous series of operations, and different specific operations may be performed in different embodiments.

The process begins at 405 by displaying all the logical entities for a logical network, and the overall realization status of the desired state for each displayed logical entity. As discussed above, the realization status may be determined by different mechanisms operating within the control plane 110 and the management plane 105.

Through the user interface, the process 400 receives at 410 a user selection of one of the displayed logical entities. In response to the selection, the process 400 displays at 415 a timeline of pending configuration changes for the selected logical entity. The timeline in some embodiments is for an attention window that begins at the current time and ends at a specific time in the past. For example, if the attention window is five minutes, and the current time is 14:55:00, then the attention window ranges from 14:50:00 to 14:55:00. The duration of the attention window is configurable in some embodiments through the user interface.

Through the user interface, the process 400 receives at 420 a user selection of a specific pending configuration change. The process 400 displays at 425 selected information regarding the selected pending configuration change. In some embodiments, this information includes whether the individual configuration change is due to a user's input or due to a topology change, details about the user or topology change, what properties of the logical entity were modified by the configuration change, and old and new values of the modified properties. The process 400 then ends.

In any eventually consistent system, there is an inherent latency between the time an update is received and the time the update is configured on all intended targets. This is normal system operation, and presenting a timeline of pending changes as well as an overall realization status for the logical entity (e.g., a two-part status) is a way to convey the same to the user in some embodiments. For example, for a given logical entity, the average configuration latency could be five minutes. If an update that was received within the last five minutes by the management plane 105 is in the pending updates list, then the user has no reason for concern as this is normal system operation. This normal latency can be represented visually in some embodiments as the duration of the timeline. On the other hand, if the pending update was received more than five minutes ago, then it may be considered an aberration, and the realization status is updated to reflect this.

Not all pending updates are presented in some embodiments to the user. If there are pending updates older than the expected latency of the system update, then this is represented in some embodiments by changing the overall realization status of the logical entity to reflect that changes are still in progress, even though the change is not visible in the timeline. The reasoning here is that the user has a short attention span towards a specific update. After that, the user's attention turns to the overall status of the entity.

The two parts put together provide a complete picture of the configuration process of the logical entity at the time of the user's query, and are considered the current-status of the logical entity. At the same time, the pending updates list allows user to track a specific update for a specific period of time (e.g., the attention window). If the user doesn't see a certain update in the pending updates list (e.g., the timeline) and the overall realization status is success, then this implies that the update has been successfully configured on the intended transport nodes. If the user doesn't see a certain update in the pending updates list (e.g., the timeline) and the overall realization status is in-progress, then it's been longer than the attention window since the update was received and therefore it cannot be tracked any longer.

Since the timeline is a real-time view, it must be routinely refreshed to provide up to date information on pending configuration changes. The refresh operation is performed automatically in some embodiments on a periodic basis, where the period of time between refresh operations is configurable, and in some embodiments, related to the duration of the attention window. For example, if the attention window is five minutes, then the refresh operation may be configured to occur every minute. Alternatively or conjunctively, the refresh operation may be initiated manually by the user, for example by selecting a user interface element.

Figure 5:
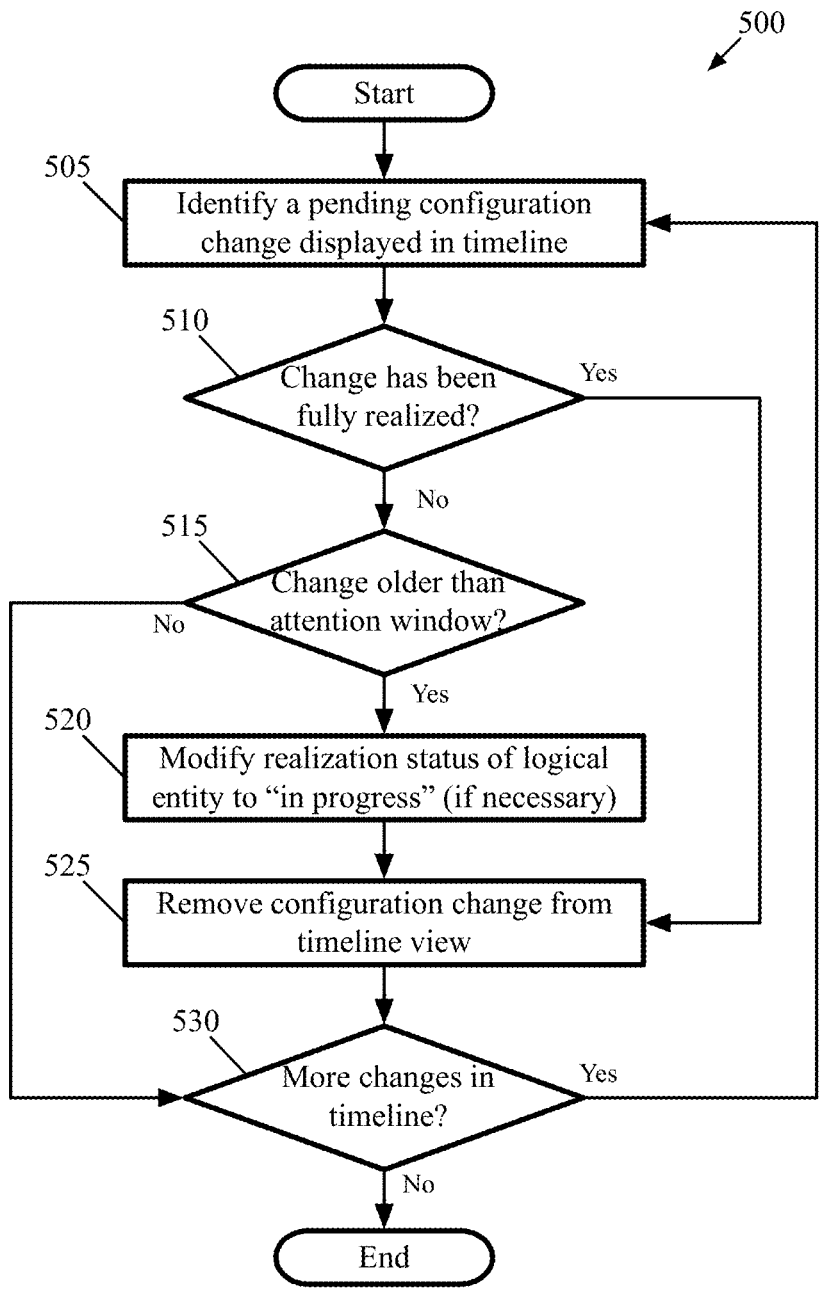
FIG. 5 conceptually illustrates a process of some embodiments to refresh a timeline of pending configuration changes.

In order to present relevant information without clutter, in some embodiments the timeline view of pending configuration changes omits changes that have been completed, or pending changes that were submitted earlier than the attention window, during the refresh operation. FIG. 5 conceptually illustrates a process 500 performed in some embodiments by the management plane 105 and/or the control plane 110 to refresh the timeline on a periodic basis. The specific operations of the process 500 may not be performed in the exact order shown and described. The specific operations may not be performed in one continuous series of operations, and different specific operations may be performed in different embodiments.

The process 500 begins at 505 by identifying at 505 a pending configuration change that is displayed in the timeline. The process determines at 510 whether the pending configuration change has been fully realized since the last timeline refresh. Different mechanisms for determining whether a configuration change has been realized are discussed above with reference to FIG. 3.

When the process 500 determines that the pending configuration change has been successfully realized, the process continues to operation 525, which is described below. When the process 500 determines that the identified pending change has not yet been realized, then the process determines at 515 whether the change is older than the attention window. In other words, for an example attention window of five minutes, the process 500 determines whether the identified change was submitted or created by the management plane 105 at a point in time during the attention window (e.g., during the past five minutes) or earlier (e.g., more than five minutes ago).

When the process 500 determines that the pending change is not older than the attention window, then the change should continue to be displayed in the timeline. Accordingly, the process continues to operation 530, which is described below.

When the process 500 determines that the pending change is older than the attention window, the process ensures at that the overall realization status of the logical entity is "in progress" to indicate that there are still pending changes remaining. If the overall realization status of the logical entity was "success" prior to the current timeline refresh, then the process 500 modifies the overall realization status from "success" to "in progress." If the overall realization status was already "in progress," then the process 500 does not need to modify the status. Likewise, if the realization status is "error" or "unknown at 525" (described in further detail below) then the process does not need to modify the status.

When the process 500 has determined that the pending change is older than the attention window, the process removes the pending change from the timeline. In this manner, the pending change is "rolled up" into the overall realization status. Likewise, when the process 500 has determined that a pending change has been successfully realized, the process also removes at 530 the realized change from the timeline. In this manner, the completed change is also "rolled up" into the overall realization status. By removing older pending changes and completed changes from the timeline, the timeline provides a real-time view of only those pending changes during the attention window.

The process 500 determines at 530 whether there are additional pending changes in the timeline. In some embodiments, this determination also includes determining whether there are new pending changes that were submitted since the last refresh and have not yet been displayed in the timeline. If the process determines that there are new changes to refresh, then the process returns to 505, which was described above. Otherwise, the process 500 ends.

Figure 6:
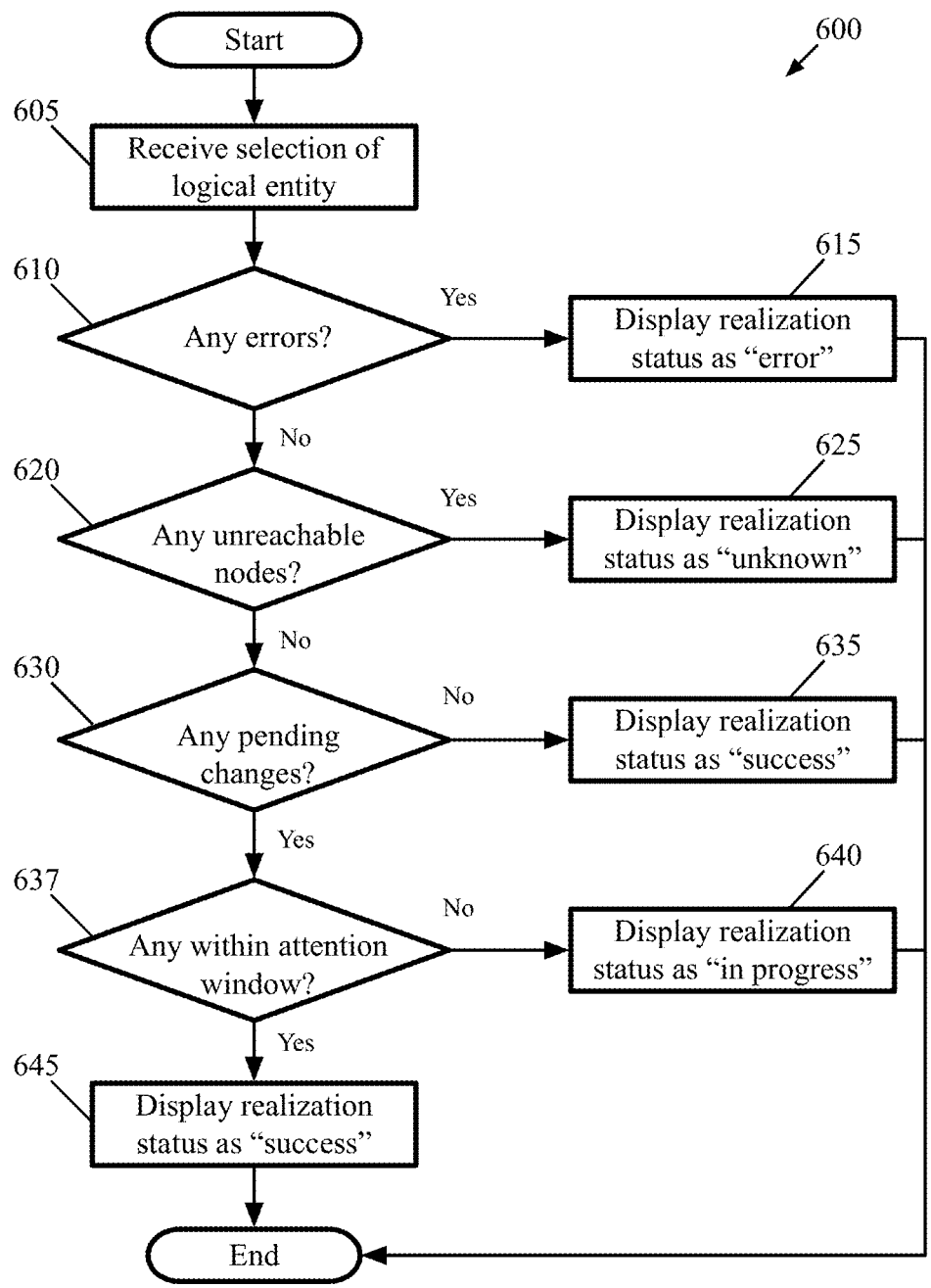
FIG. 6 conceptually illustrates a process performed in some embodiments to determine what overall realization status to display for a logical entity.

As discussed above, the realization status may be presented on the interface as an overall realization status for a logical entity, or a node realization status for an individual transport node that implements the logical entity. FIG. 6 conceptually illustrates a process 600 performed in some embodiments by the management plane 105 and/or the control plane 110 to determine what overall realization status to display for a logical entity. Though process 600 is described below in the context of overall realization status, the same process 600 can also be used in some embodiments to determine what node realization status should be displayed for a specific transport node. The specific operations of the process 600 may not be performed in the exact order shown and described. The specific operations may not be performed in one continuous series of operations, and different specific operations may be performed in different embodiments.

The process 600 begins at 605 by receiving through the user interface a selection of a logical entity. The process determines at 610 whether an error exists on a transport node that impacts the configuration or use of the logical entity. In other words, the process determines whether there are any errors in realizing the desired state for the selected logical entity at any of the transport nodes that implement the logical entity. If the process determines that there is at least one such error, then the process 600 displays at 615 the overall realization status as "error" and also in some embodiments displays a relevant error message reported by the affected transport node. The process 600 then ends. If the process determines that there are no errors at any of the transport nodes, then the process continues to 620, which is described below.

The process determines at 620 whether there are any transport nodes implementing the selected logical entity which cannot be reached to query or determine the realization status. If the process 600 determines that there is at least one such unreachable transport node, then the process 600 displays at 625 the overall realization status as "unknown" and also in some embodiments displays relevant details of the unreachable transport node, e.g. an L3 Internet Protocol (IP) address, an L2 MAC address, or other identifying information. The process 600 then ends. If the process 600 is able to successfully query all the transport nodes, then the process continues to 630, which is described below.

The process determines at 630 whether there are any pending changes at any of the transport nodes that implement the logical entity. In other words, the process determines whether any of the transport nodes have not yet realized the desired state. Mechanisms for determining the realization status were described above. If the process 600 determines that there are no more pending changes (e.g., that the desired state has been realized at all transport nodes that implement the logical entity), then the process 600 displays at 635 the overall realization status as "success." The process 600 then ends.

If the process 600 determines that there still is at least one pending change (e.g., that the desired state has not yet been realized for at least one transport node that implements the logical entity), then the process 600 determines at 637 whether any of the pending changes were submitted within the attention window. In other words, for an example attention window of five minutes, the process 600 determines for each pending change whether the change was submitted or created by the management plane 105 at a point in time during the past five minutes, or was submitted/created more than five minutes ago.

If the process 600 determines that none of the pending changes were submitted within the attention window, then it displays at 640 the overall realization status as "in progress."

The process 600 then ends. It is possible in some embodiments for a transport node to satisfy the conditions for a realization status of both "error" and "in progress." In such cases, the realization status is presented as "error" in some embodiments.

If the process 600 determines that at least one of the pending changes was submitted within the attention window, then it displays at 645 the overall realization status as "success." The process 600 then ends.

In some embodiments, the different types of realization status may be represented on the user interface as different symbols, colors, or other different types of indicators on the interface. For example, "success" may be represented as a green symbol, "error" as a red symbol, and "in progress" as a yellow symbol.

Figure 7:
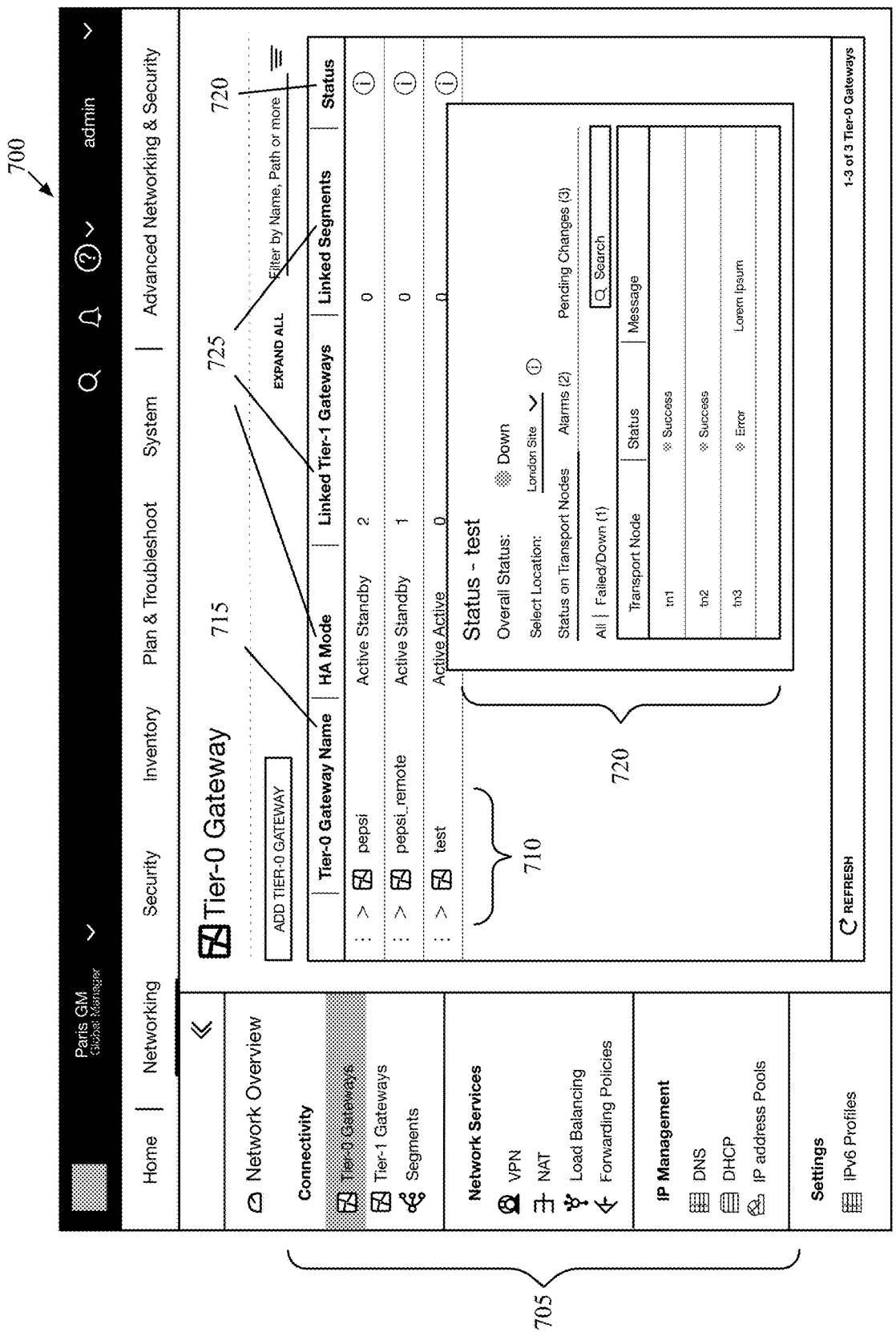
FIG. 7 illustrates an example of a user interface of some embodiments for visualizing the realization status of logical entities for a logical network.

FIG. 7 illustrates an example of a user interface 700 of some embodiments for visualizing the realization status of logical entities for a logical network. This user interface is generated in some embodiments by the user interface module in the management plane 105, and in some embodiments is one component of a larger interface for general configuration and administration of the logical network. The interface has a side panel 705 where the user may select different categories of logical entities of the logical network (and in some embodiments, also select different logical networks) for investigation.

Some examples of logical entity categories include Tier-0 gateways, which are edge logical routers that connect the logical network to external physical networks; Tier-1 gateways, which are logical routers that connect to Tier-0 gateways in the northbound (uplink) direction and to network segments in the southbound (downlink) direction; and network segments, which are logical switches that connect to Tier-1 gateways in the northbound (uplink) direction and virtual machines in the southbound (downlink) direction. In the example logical network 200 of FIG. 2, the edge router 230 is a Tier-0 gateway, since it connects to an external network 225. The logical router 205 is a Tier-1 gateway, connecting to the edge router 230 and to the logical switches 210-215. The logical switches LS1 210 and LS2 215 are network segments, connecting to the logical router LR1 205 and to the virtual machines 119-120.

After receiving a user selection of a category of logical network entity, the user interface 700 displays a list 710 of all such logical entities of the selected category currently configured for the logical network. In some embodiments, this list can be filtered based on the access permissions of the user, entity name, path, or other parameters. The list includes the name 715 of the logical entity and an indicator 720 of the entity's realization status, as well as other configuration and operational information 725. In some embodiments, the status is the overall realization status, which is determined as described above. Alternatively or conjunctively, the realization status is an icon in some embodiments that the user can select to generate an additional sub-interface element 720 for further investigation of the logical element's realization status. This sub-interface element, which in some embodiments is a pop-up window over the rest of the interface 700, is described in further detail below with reference to FIG. 8.

Figure 8:
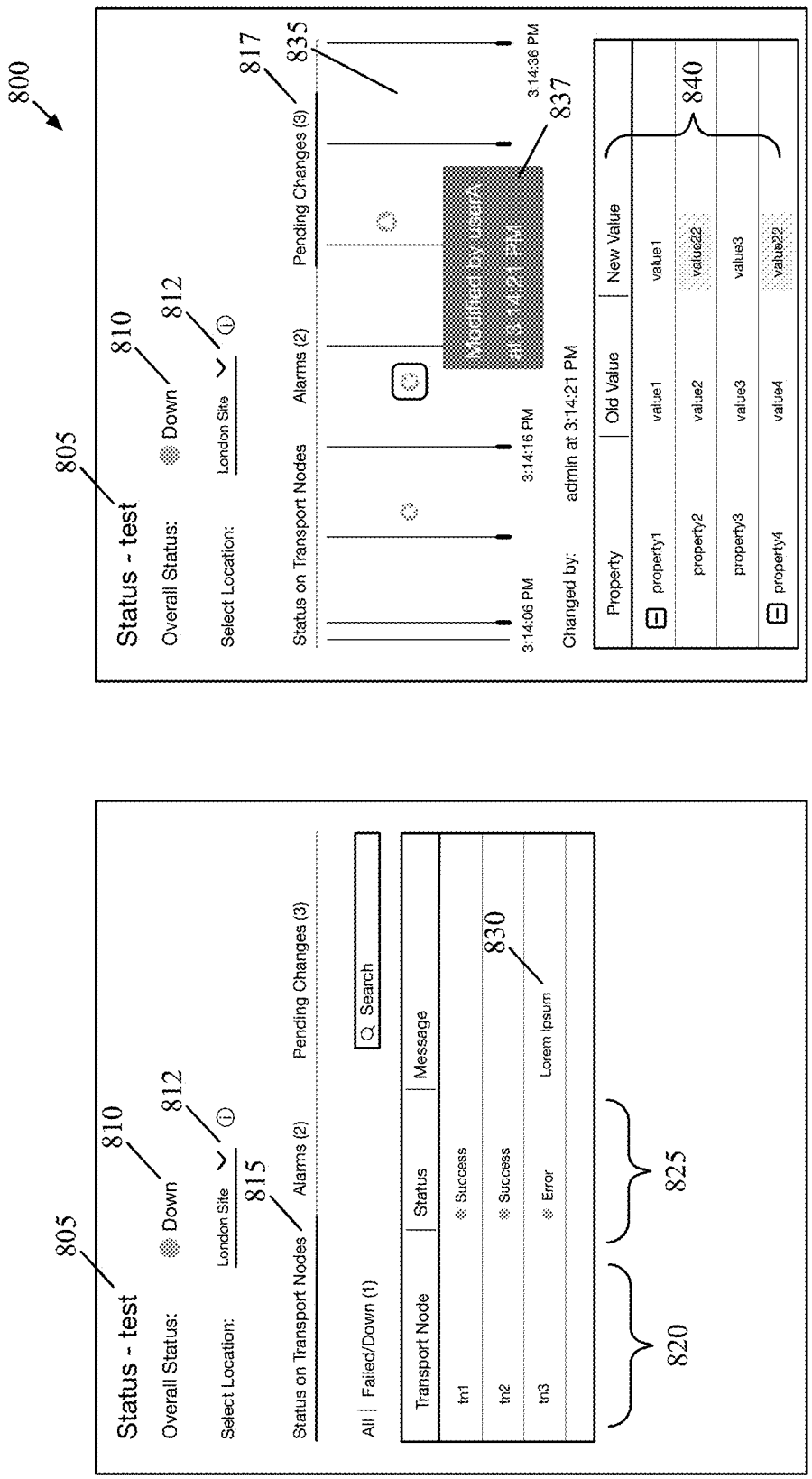
FIG. 8 illustrates examples of a sub-interface of the interface illustrated in FIG. 7 for further investigation of a logical element's realization status.

For a logical interface entity selected using the interface described in FIG. 7, in some embodiments a sub-interface provides information about the realization status of the desired state on the transport nodes that implement the logical entity, information about individual pending configuration updates, and other information of use in investigating the details of the realization status of the selected logical entity. FIG. 8 illustrates examples of a sub-interface 800 that provides some or all of this information in some embodiments. The sub-interface can be modified to show different types of information (also referred to as views) by selecting a user interface element, such as different tabs that represent the different views that are available for display on the sub-interface.

FIG. 8 illustrates two examples of sub-interface views. Each sub-interface displays the name of the selected logical entity 805, and the overall realization status 810 of the selected logical entity as determined above with reference to FIG. 6. In addition, the sub-interface also displays in some embodiments a filtering interface 812 that allows the user to only show a subset of information in the view. For example, the filtering interface may be a dropdown selector that allows a user to specify a specific physical network location out of all the physical network locations where the logical entity is implemented.

In the first example (left panel), a tab 815 for displaying the realization status on the transport nodes is selected. Accordingly, the sub-interface shows a view that displays a list 820 of transport nodes that implement the selected logical entity. The view also displays the node realization status 825 for each transport node in the list 820. In some embodiments, the view also displays contextual information associated with each node realization status. For example, the node realization status for transport node "tn3" is an error status, so the contextual information associated with that status is an error message 830 returned by that node. Different types of contextual information are displayed in such embodiments, depending on the realization status of the node.

FIG. 8 also illustrates a second example (right panel) of a sub-interface view. As with the other example, the sub-interface displays the name of the selected logical entity 805, and the overall realization status 810 of the selected logical entity, and the filtering interface 812. In this example, a tab 817 for displaying information about pending configuration changes is selected. Accordingly, the sub-interface shows a view that displays a timeline 835 of the pending configuration changes for the selected logical entity, that have been submitted within the attention window. Other embodiments may represent the pending configuration changes in a different visual form than a timeline, such as a list.

The timeline ranges from the current system time (e.g., 3:14:36 PM) to a previous point in time (e.g., 3:14:06 PM). The timeline is divided into buckets in some embodiments, where each bucket represents has a timestamp for a fixed window of time (e.g., 5 seconds). In some embodiments, the timeline has a scrolling interface to cover a longer attention window than the visible period of time. The duration of the visible timeline without scrolling depends in some embodiments on the duration of the attention window. For example, if the attention window for pending configuration changes is 5 minutes, then the visible timeline may display 30 seconds of time, and the user scrolls further backwards in time to review any other portion of the entire 5 minutes. In some embodiments, the duration of the visible timeline depends on the bucket length (i.e., the granularity of the buckets' timestamp).

In some embodiments, each pending configuration update is represented on the timeline as an icon. Some embodiments may vary the style of the icon to represent details specific to the pending update, such as whether the update was initiated by a user or by a topology change. The user may select the icon in some embodiments to further investigate details about the pending configuration change. For example, in some embodiments, selecting the icon causes the interface to display summary information 837 about the configuration change, such as which user initiated or modified the change, the precise timestamp of the change, etc. This summary information may be displayed in different ways, including as a pop-up over the sub-interface, or as text that is rendered in a separate portion of the sub-interface.

In addition, in some embodiments if a particular configuration change updates the values of a certain set of properties of the selected logical entity, then selecting that particular change on the icon (e.g., by clicking the icon on the timeline that represents the pending change) causes the view to display a table 840 that lists the set of properties, and for each property, (1) an old value prior to the configuration change being submitted and (2) a new value for the property to take effect when the pending change has been realized. Alternatively, the old value is the real-time value of the property in some embodiments, as the value of the property may have been modified by other configuration changes after the configuration change was submitted. In some embodiments, the table of old and new property values only displays properties affected by the selected pending configuration update. In other embodiments, the table of old and new property values displays property values that can be affected by the pending configuration update, even if the actual selected configuration update does not modify some of the displayed properties.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

As used in this specification, the term data packet, packet, data message, or message refers to a collection of bits in a particular format sent across a network. It should be understood that the term data packet, packet, data message, or message may be used herein to refer to various formatted collections of bits that may be sent across a network, such as Ethernet frames, IP packets, TCP segments, UDP datagrams, etc. While the examples above refer to data packets, packets, data messages, or messages, it should be understood that the invention should not be limited to any specific format or type of data message.

This specification refers throughout to computational and network environments that include virtual machines (VMs). However, virtual machines are merely one example of data compute nodes (DNCs) or data compute end nodes, also referred to as addressable nodes. DCNs may include non-virtualized physical hosts, virtual machines, or containers that run on top of a host operating system without the need for a hypervisor or separate operating system, and hypervisor kernel network interface modules. One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
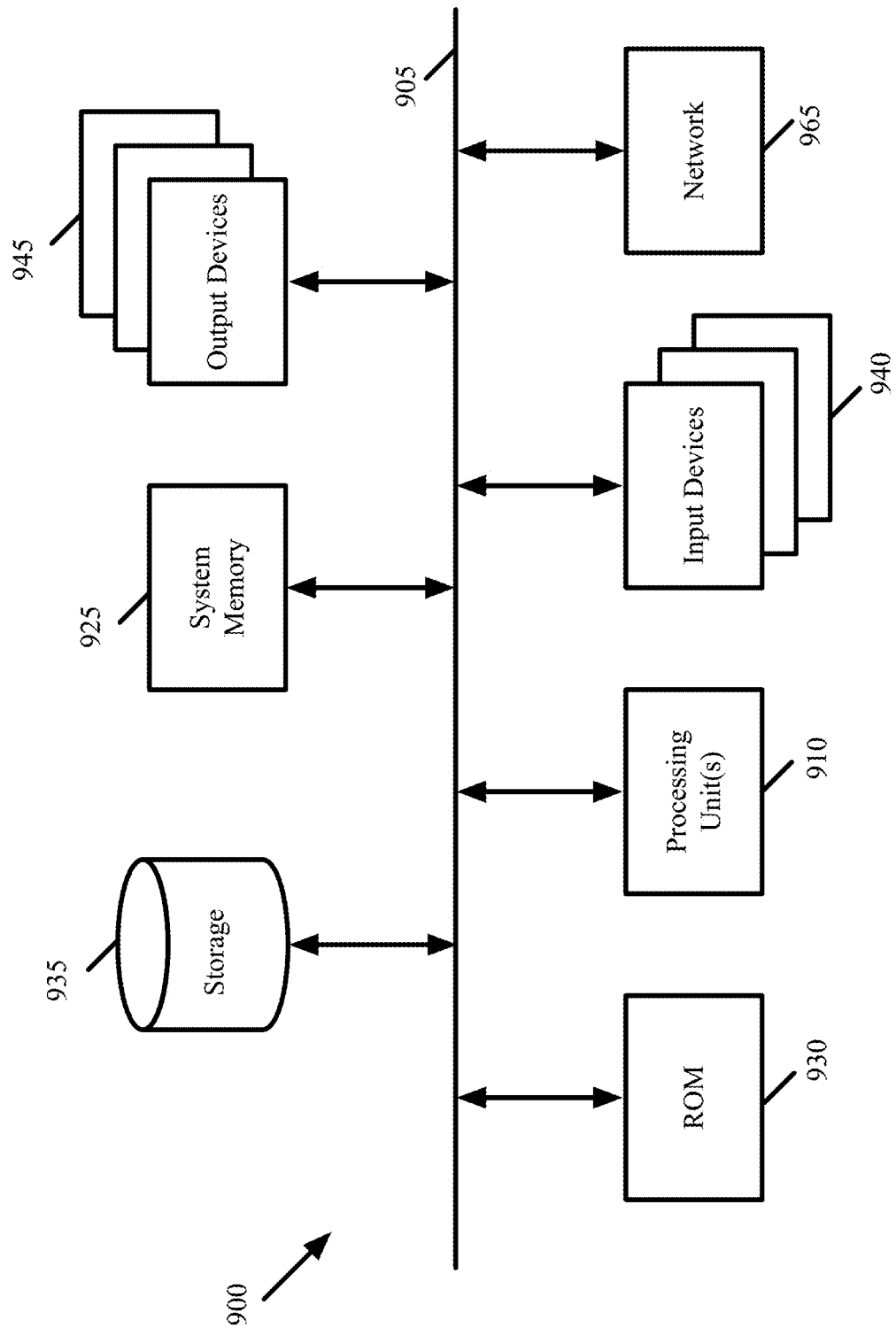
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such as random-access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, at least one figure conceptually illustrates a process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for visualizing a realization status of configuration changes directed by a set of network management processes for a set of logical entities of a logical network, the method comprising:
   generating a first presentation of a list of logical entities and a realization status for each logical entity in the list, each respective logical entity of a plurality of the logical entities implemented by configuring a respective plurality of physical entities, said realization status of each particular logical entity indicating whether a set of network management processes that verify realization of logical entity configurations have verified that all configuration changes for configuring a set of one or more physical entities that implement the particular logical entity have been realized on all of the physical entities that implement the particular logical entity; and
   in response to a selection of a particular logical entity in the displayed list for which at least one configuration change has not yet been realized, generating a second presentation comprising a view of one or more pending configuration changes for the selected particular logical entity that have been submitted to the set of network management processes but are not yet implemented by all of the physical entities that implement the particular logical entity.

2. The method of claim 1, wherein the second presentation includes previously realized configuration changes that are submitted to the set of network management processes and implemented by all of the physical entities that implement the particular logical entity.

3. The method of claim 1, wherein the second presentation excludes previously realized configuration changes that are submitted to the set of network management processes and implemented by all of the physical entities that implement the particular logical entity.

4. The method of claim 1, wherein the set of network management processes verify the realization status for each particular logical entity using one of a state tracking object and a global realization number.

5. The method of claim 1, wherein the view of pending configuration changes for the selected particular logical entity is a timeline of pending configuration changes submitted to the set of network management processes during a fixed period of time relative to a current time.

6. The method of claim 5 further comprising, in response to a selection of a particular pending configuration change for the particular logical entity that has been submitted to the set of network management processes but is not yet implemented by all of the physical entities that implement the particular logical entity, generating a third presentation of information associated with the selected pending configuration change.

7. The method of claim 6, wherein the third presentation comprises a list of properties of the particular logical entity that are updated by the selected pending configuration change.

8. The method of claim 7, wherein the list of properties comprises (i) an old value for the property prior to the pending configuration change being submitted to the set of network management processes and (ii) a new value for the property set after the pending configuration change is fully realized at all of the physical entities that implement the particular logical entity.

9. The method of claim 6, wherein the third presentation comprises an indication whether the selected pending configuration change was initiated by a user or by a change in the logical network topology.

10. The method of claim 1, wherein each particular logical entity is one of a logical router, a logical switch, a port of a logical router, and a port of a logical switch.

11. The method of claim 1, wherein the realization status comprises one of success, in progress, error, and unknown.

12. The method of claim 1, wherein the view is a first view, wherein the second presentation further comprises a second view of managed forwarding elements that implement the selected particular logical entity and a realization status for each managed forwarding element, wherein the realization status for a particular managed forwarding element indicates whether all configuration changes for the particular logical entity have been realized at the particular forwarding element.

13. The method of claim 11, wherein the realization status of the particular logical entity is in progress if a realization status of at least one physical entity that implements the particular logical entity is in progress and no physical entities that implement the particular logical entity have realization statuses of error or unknown.

14. The method of claim 1, wherein a particular configuration change for the particular logical entity has been submitted to the set of network management processes when a user has requested for the set of network management processes to realize the particular configuration change at the physical entities that implement the particular logical entity.

15. The method of claim 1, wherein a particular pending configuration change for the particular logical entity has been implemented at a first one of the physical entities that implement the particular logical entity but not at a second one of the physical entities that implement the particular logical entity.

16. A non-transitory machine readable medium storing a program which when executed by at least one processing unit visualizes a realization status of configuration changes that a set of network management processes perform for a set of logical entities of a logical network, the program comprising sets of instructions for:
generating a first presentation of a list of logical entities and a realization status for each logical entity in the list, each respective logical entity of a plurality of the logical entities implemented by configuring a respective plurality of physical entities, said realization status of each particular logical entity indicating whether a set of network management processes that verify realization of logical entity configurations have verified that all configuration changes for configuring a set of one or more physical entities that implement the particular logical entity have been realized on all of the physical entities that implement the particular logical entity; and
in response to a selection of a particular logical entity in the displayed list for which at least one configuration change has not yet been realized, generating a second presentation comprising a view of one or more pending configuration changes for the selected particular logical entity that have been submitted to the set of network management processes but are not yet implemented by all of the physical entities that implement the particular logical entity.

17. The non-transitory machine readable medium of claim 16, wherein the second presentation includes previously realized configuration changes that are submitted to the set of network management processes and implemented by all of the physical entities that implement the particular logical entity.

18. The non-transitory machine readable medium of claim 16, wherein the second presentation excludes previously realized configuration changes that are submitted to the set of network management processes and implemented by all of the physical entities that implement the particular logical entity.

19. The non-transitory machine readable medium of claim 16, wherein the view of pending configuration changes for the selected particular logical entity is a timeline of pending configuration changes submitted to the set of network management processes during a fixed period of time relative to a current time.

20. The non-transitory machine readable medium of claim 16, wherein the view is a first view, wherein the second presentation further comprises a second view of managed forwarding elements that implement the selected particular logical entity and a realization status for each managed forwarding element, wherein the realization status for a particular managed forwarding element indicates whether all configuration changes for the particular logical entity have been realized at the particular forwarding element.

21. A method for visualizing a realization status of configuration changes that a set of network management processes perform for a set of logical entities of a logical network, the method comprising:
generating a first presentation of a list of logical entities, each respective logical entity of a plurality of the logical entities implemented by configuring a respective plurality of physical entities; and
in response to a selection of a particular logical entity in the displayed list for which at least one configuration change has not yet been realized, generating a second presentation of one or more pending configuration changes for the selected particular logical entity that have been submitted to the set of network management processes but are not yet implemented by all of the physical entities that implement the particular logical entity, wherein the second presentation does not include previously completed configuration changes.

22. The method of claim 21, wherein the first presentation comprises a realization status for each logical entity in the list, said realization status of each particular logical entity indicating whether a set of network management processes that verify realization of logical entity configurations have verified that all configuration changes for configuring a set of one or more physical entities that implement the particular logical entity have been realized on all of the physical entities that implement the particular logical entity.

* * * * *